May 19, 1931. J. S. STULL 1,806,130
STOCK FEEDING DEVICE
Filed Sept. 9, 1929
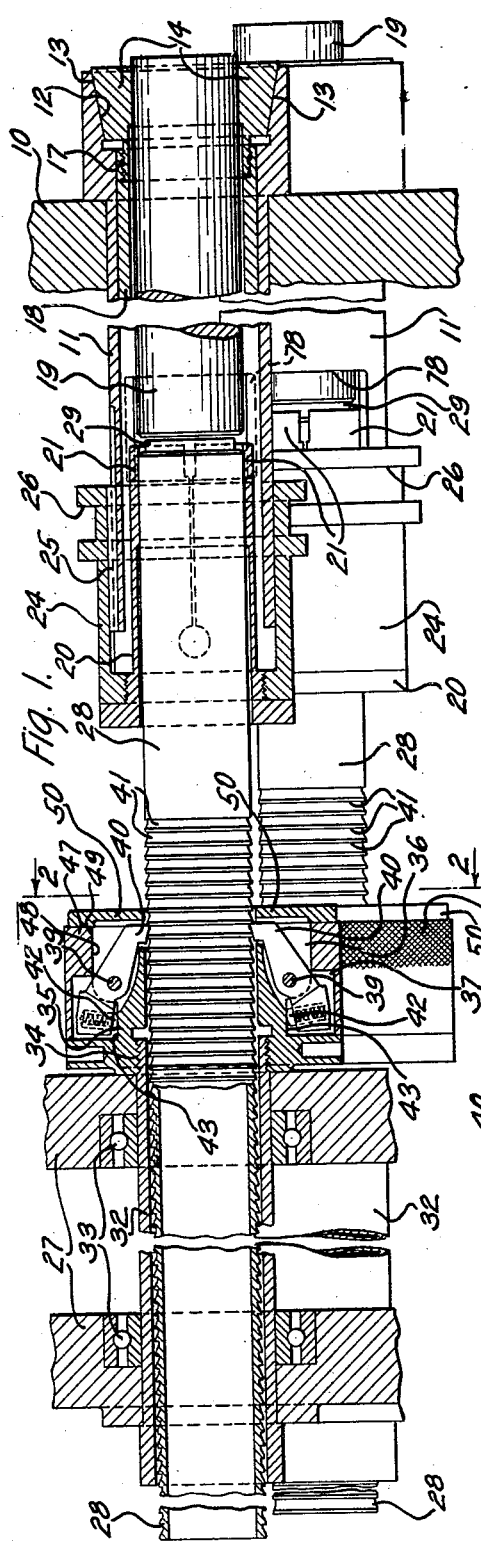
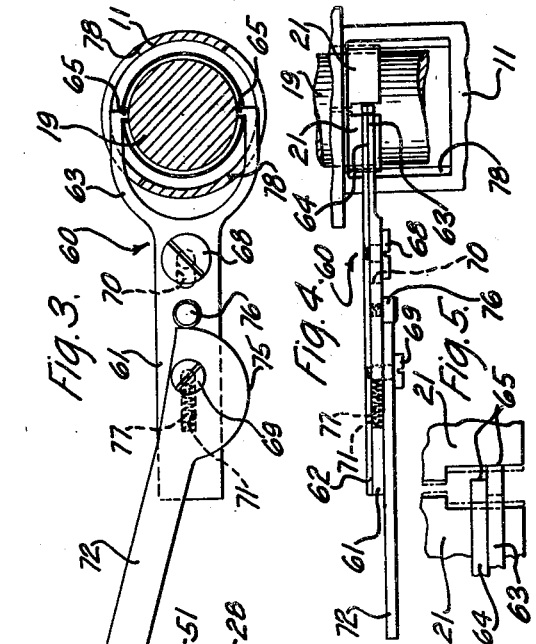
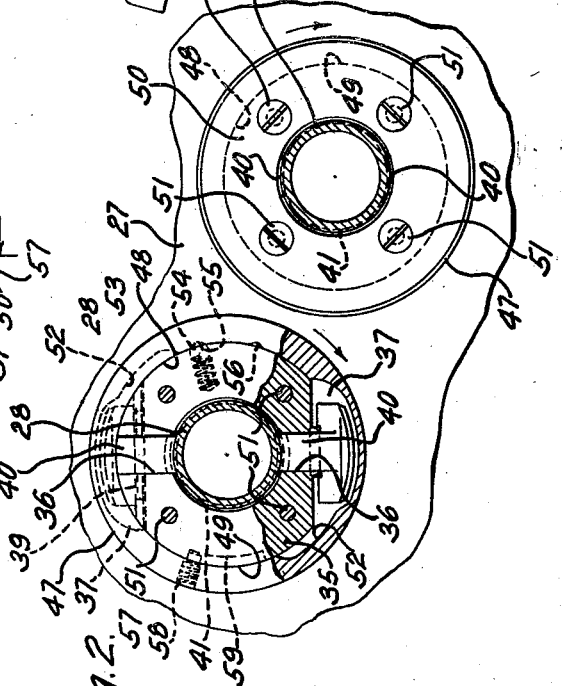
Inventor
John S. Stull
By H. A. Patterson Atty.

Patented May 19, 1931

1,806,130

UNITED STATES PATENT OFFICE

JOHN S. STULL, OF CHICAGO, ILLINOIS, ASSIGNOR TO WESTERN ELECTRIC COMPANY, INCORPORATED, OF NEW YORK, N. Y., A CORPORATION OF NEW YORK

STOCK FEEDING DEVICE

Application filed September 9, 1929. Serial No. 391,177.

This invention relates to stock feeding devices, and more particularly to devices for advancing stock to be worked by automatic machines designed to produce piece parts.

The primary object of this invention is to provide a device designed to facilitate and expedite the advancing of stock on which work is desired to be performed.

In accordance with one embodiment of this invention as applied to multiple spindle automatic screw machines, the usual split feed sleeve associated with each spindle for advancing bar stock to the stock holding chuck has inserted therein when the stock becomes of a length which no longer allows the feed sleeve to grip and feed it forwardly, a sleeve having a diameter substantially identical with that of the bar stock being fed and provided peripherally with ratchet grooves. The ratchet grooves are engaged at diametrically opposite points by spring actuated pawls for retaining the substitute bar in its advanced position when the feed sleeve is retracted, but permitting its forward movement during the advance thereof by the feed sleeve. A rotatable cam ring mounted on the support for the pawls and operatively engageable therewith is provided for disassociating the pawls from the inserted sleeve and rendering them ineffective when the feed sleeve is engaged with the bar stock.

Other objects and advantages of this invention will more fully appear from the following detailed description taken in connection with the accompanying drawings, wherein Fig. 1 is a fragmentary longitudinal view, partly in section, of a multiple spindle automatic screw machine embodying the features of this invention;

Fig. 2 is a vertical section on the line 2—2 of Fig. 1;

Fig. 3 is a side view of a tool for expanding the stock feeding sleeve, shown applied thereto;

Fig. 4 is a plan view thereof, and

Fig. 5 is a fragmentary enlarged view of Fig. 4 showing the tool in an actuated position to expand the stock feeding sleeve.

Referring now to the drawings in detail wherein similar reference numerals indicate like parts throughout the several views, a work carrier or head 10 rotatable about a fixed axis is shown fragmentarily and carries a plurality of hollow work rotating spindles 11 continuously rotatable about their individual axes while being bodily revolved by the head, such as is common in certain types of multiple spindle automatic screw machines. Each of the spindles 11 at its forward end is enlarged and conically bored, as indicated at 12, for engagement with complementary formed surfaces 13 provided upon contractile work or stock grasping jaws 14 integral with a collar 17, which at its inner end is threaded into the end of a sleeve 18 reciprocable in the spindle 11. It will be apparent that upon a reciprocable movement of the sleeve 18 toward the left to the position shown in Fig. 1, due to the cooperating conical surfaces 12 and 13 upon the spindle 11 and the jaws 14, respectively, work in the form of circular bar stock 19 advanced into position between the jaws 14 will be grasped thereby and upon a reverse movement of the sleeve 18 the stock 19 will be released therefrom. The usual tool head associated with the work carrier or head and positioned adjacent the forward ends of the spindles 11 is not shown since it forms no part of the present invention and is not necessary to a clear understanding thereof.

The bar stock 19 is advanced from the rear end of the work spindle 11 into position between the jaws 14 by a reciprocable feed sleeve 20 rotatable with the spindle 11, the feed sleeve having its right end (Fig. 1) slotted for a suitable distance at diametrically opposite points to provide contractile stock gripping fingers 21. At its left end the periphery of the feed sleeve 20 is threaded for the attachment thereto of an actuating collar 24 which is splined as indicated at 25 to the spindle 11 so that it rotates with the spindle but may be reciprocated thereon to operate the feed sleeve 20, the periphery of the collar having an annular channel 26 which is operatively connected to a suitable actuating element (not shown) of the machine. The bar stock 19 when first inserted into the feed sleeve 20 is comparatively long and may extend a distance from the rear end of the work rotating spindle, its rear end being supported in a carrier 27, shown fragmentarily and well understood to those skilled in the art, the carrier being rotated in unison with the head 10.

It is to be understood that the work carrier or head 10 for indexing the spindles 11, sleeve 18 for closing and releasing the jaws 14, and the feed sleeve 20 for advancing the bar stock 19 to the jaws 14 are operated in proper sequence by suitable mechanism, which form a part of the known automatic screw machine and are not shown in the drawings.

As shown in Fig. 1 of the drawings the bar stock 19 has been advanced by successive feeding movements of the sleeve 20 until it is of comparatively short length relative to its original length and upon retraction of the feed sleeve after its last feeding movement the contractile gripping fingers 21 have been withdrawn from engagement with the trailing end of the nearly exhausted bar stock and consequently when the next feeding movement of the feed sleeve occurs the bar stock will not be advanced a predetermined distance into and through the jaws 14. At this point in the operation of the machine as each successive bar stock 19 becomes of a length such that the feed sleeve 20 is not operable to feed it further, the operator introduces into the feed sleeve a sleeve 28 having substantially the diameter of the bar stock and of a predetermined length which is gripped by the contractile fingers 21 in the same manner that the bar stock is gripped thereby; the sleeve 28 being inserted through the feed sleeve 20 until its forward end engages the rear end of the short piece of bar stock. The forward end of the sleeve 28 has rotatably mounted therein a nose piece 29 which contacts with the rear end of the short piece of bar stock 19 for the purpose of reducing friction between the sleeve 28 and the bar stock 19 during any relative rotation therebetween occuring during the insertion of the sleeve or in the operation of the machine.

Revolving with the carrier 27 are a plurality of individually rotatable tubes 32 supported by ball bearings 33 at each end of the carrier 27 and axially aligned with the spindles 11 into which the bar stock 19 or the hollow sleeve 28 is inserted to be gripped by the fingers 21 of the feed sleeve 20. The forward end of each tube 32 projects through the carrier 27 and is peripherally threaded, as indicated at 34, upon which is secured a collar 35. At diametrically opposite points the collar 35 is formed with radial slots 36 connecting with slots 37 extending at right angles thereto. Pivotally mounted at 39 in each of the radial slots 36 is a pawl 40 engaging at its inner end in ratchet grooves 41 or other specially formed formations formed in the periphery of the hollow sleeve 28 and extending therealong for a predetermined distance, the engaging surface of the pawl being arcuate to conform to the surface of the sleeve. The ratchet grooves 41 are shaped and spaced in such a manner that when the sleeve 28 is fed forward by the feed sleeve 20 the pawls ride out of and into the grooves and at the end of the feeding movement they are positioned at the bottom of a groove as shown in Fig. 1. During the retraction of the feed sleeve 20 subsequent to the next feeding movement thereof it will be apparent that the pawls 40 will retain the sleeve 28 in its advanced position adjacent the trailing end of the bar stock 19, the feed sleeve slipping back on the sleeve 28 in the same manner that it does when feeding bar stock. The ratchet grooves 41 extend the full length of the sleeve 28 except for a certain distance from the forward end thereof where it is apparent they are not necessary. The opposite end of the pawl 40 upon one side is provided with a spring pressed pin 42 bearing against a peripheral shouldered surface 43 of the collar 35, the pin and spring serving to hold the opposite end of the pawl in engagement with the peripheral ratchet grooves 41 of the sleeve 28, except when the pawls are withdrawn and held therefrom by means to be presently described.

Journaled upon the collar 35 is a ring 47 provided with an inner peripheral surface 48 rotatable upon an outer shouldered peripheral surface 49 of the collar, the outer periphery of the ring being flush with the periphery of the collar at its greatest diameter. A ring plate 50 fixed to the end face of the collar 35 by screws 51 secures the ring 47 in position upon the collar 35. Formed in the inner peripheral surface 48 of the ring 47 at diametrically opposite points are cam surfaces 52 in line with the ends of the pawls 40 which carry the spring pressed pins 42, the side of each of the pawls opposite the pin 42 being formed arcuate to conform to the cam surfaces. Mounted in a depression 53 formed in the outer peripheral surface 49 of the collar 35 is a spring pressed ball 54 engageable in one or the other of predeterminedly spaced locking notches 55 and 56 (Fig. 2) formed in the inner peripheral surface 48 of the ring 47. As shown in the drawings the pawls 40 are engaging the ratchet grooves 41 of the sleeve 28, in which position the ball 54 is entered in the notch 55, thereby retaining the pawls in an operating position. When it is desired to withdraw the pawls 40 from the ratchet grooves 41 and hold them in an inoperative position, which is done when the sleeve 28 is removed from the feed sleeve 20 and another full length bar of stock 19 is inserted to be advanced directly by the feed sleeve, the operator grasps a knurled peripheral portion 57 of the ring 47 and rotates it counterclockwise, as viewed in Fig. 2, until he senses the ball 54 springing into the notch 56 of the ring 47. The movement of the ring 47 upon the collar 35 is limited in either direction by a pin 58 carried by the ring 47 engaging opposite ends of a channel 59 formed in the peripheral surface 49 of the collar 35 (Fig. 2). During this rotation of the ring 47 the cam surfaces 52 simultaneously engage the adjacent ends of the pawls 40 and cause them to rotate about their pivots and disengage from the ratchet grooves 41 of the sleeve 28, in which position they will be retained until a reverse rotation of the ring permits the pawls to move back under the action of the spring pressed pins 42 to their operative position.

In order to facilitate the introduction of a full length of bar stock 19 into the feed sleeve 20 and into position between the jaws 14 carried by the collar 17 or that of the sleeve 28, into the feed sleeve 20 or the removal of the latter when the short length of bar stock 19 has been used up, a tool 60 is provided (Figs. 3, 4 and 5) for expanding the contractile fingers 21 of the feed sleeve. The tool 60 comprises two plane members 61 and 62, each formed with a bifurcated end 63 and 64, respectively, the ends of the furcations of each member being provided with inwardly extending oppositely disposed arms 65. The members 61 and 62 are secured together for relative reciprocation one on the other by means of shouldered screws 68 and 69 extending through slots 70 and 71 provided in the member 61 and threaded into the member 62. Pivotally mounted upon the screw 69 is a hand lever 72 provided with a cam surface 75 engaging a roller or pin 76 carried by the member 61 intermediate the screws 68 and 69. The members 61 and 62 are maintained in their normal position, as shown in Figs. 3 and 4, with the inwardly extending arms 65 thereof in alignment by means of a compression spring 77 mounted in the slot 71 of the member 61 and bearing at opposite ends against the screw 69 and an end wall of the slot, and in which position the low point of the cam surface 75 engages the pin 76.

In applying the tool 60 to the contractile fingers 21 of the feed sleeve 20, the head 10 is stopped in a position which will permit the operator to insert the furcations of the members 61 and 62 through diametrically opposite slots 78 formed in the spindle 11, as clearly shown in Fig. 3, with the arms 65 of each furcation inserted in the diametrically opposite slots, formed in the making of the fingers 21, of the sleeve 20. When the tool 60 is thus positioned the operator depresses the hand lever 72, which through the cam surface 75 engaging the pin 76 causes a longitudinal displacement between the members 61 and 62 in opposite directions. This displacement of the members 61 and 62 causes a like displacement of the arms 65 of each member which bear on opposite sides of the slots of the feed sleeve 20 to the position shown in Fig. 5 and expanding the contractile gripping fingers 21 of the feed sleeve 20 from the dotted outline position to the full line position thereof and thereby permitting a free introduction or removal of the sleeve 28 to or from the feed sleeve 20 or the introduction of the bar stock 19 thereto.

In the operation of the stock advancing apparatus for automatic machines just described, when a length of bar stock 19 becomes of a length which no longer allows the feed sleeve 20 to grip and feed it forwardly the sleeve 28 is introduced into the feed sleeve, after applying the tool 60 in the manner previously described and engaged at its forward end with the trailing end of the short piece of bar stock, after which the tool 60 is removed. When the sleeve 28 is in position for feeding forward the bar stock 19, the pawls 40 will be engaged in the ratchet grooves 41 of the sleeve 28, as shown in Fig. 1. Upon the sleeve 20 moving forward during the next feeding movement thereof the grip of the contractile fingers 21 upon the sleeve 28 carries it forward, the latter pushing the bar stock into the position shown in the lower spindle 11 of Fig. 1. During the retraction of the feed sleeve 20 the pawls 40 as hereinbefore described retain the sleeve 28 in its advanced position adjacent the trailing end of the bar stock 19 ready for the next feeding movement, the feed sleeve 20 sliding upon the sleeve 28 in a manner similar to that when it is advancing directly the bar stock 19.

As hereinbefore described the sleeve 28 is of a predetermined length and the ratchet grooves 41 extend the full length except for a certain distance from the forward end thereof. This insures that a sufficient length of the short length of bar stock 19 will always remain in the stock grasping jaws 14 so that the latter may have a necessary grip on the bar stock to prevent dislodgement thereof during the working of the bar stock by the tools carried by the usual tool head (not shown) in forming a piece part. Thus damage to the tools or other parts of the machine which would occur if the stock were dislodged from the jaws 14 during the forming operation is positively prevented. It will be apparent after the sleeve 28 has been advanced toward the right in feeding the short length of bar stock 19 by successive feeding movements of the feed sleeve 20 and the last ratchet groove 41 at the left end of the sleeve 28 has been advanced out of engagement with the pawls 40, that upon the retraction of the feed sleeve 20 toward the left the sleeve 28 will also be retracted, since the pawls are not operative to hold it. The remainder of the short length of bar stock 19 therefore cannot be fed any further into the jaws 14.

It will be understood that the embodiment herein described is merely illustrative of the invention, which is limited only by the terms of the appended claims.

What is claimed is:

1. In a stock feeding device for machines, means for advancing stock to a working position, including a movable member engaging the stock, an element engageable with the rear end of the stock for association with the movable member when the length of the stock is such that the movable member is not operable to feed it further, said element being provided with a specially formed surface and means cooperating with said surface for preventing the retraction of the element when the movable member is retracted.

2. In a stock feeding device for machines, means for advancing stock to a working position, including a movable member for receiving the stock inserted therein, an element engageable with the rear end of the stock for introduction into the movable member when the length of the stock is such that the movable member is not operable to feed it further, and means cooperating with serrations formed upon the peripheral surface of the element for permitting the movable member to advance the element and therewith the stock, but rendered effective for preventing the retraction of the element when the movable member is retracted.

3. In a stock feeding device for machines, means for causing alternate holding and releasing of stock before and after working thereof, means operable in timed relation with the operation of the holding means for advancing the stock thereto, including a reciprocable contractile member for receiving the stock inserted therein, an element engageable with the rear end of the stock for introduction into the reciprocable member when the length of the stock is such that the member is not operable to feed it further, and means cooperating with serrations formed upon the peripheral surface of the element for permitting the reciprocable member to advance the element and therewith the stock, but rendered effective for preventing the retraction of the element when the member is retracted.

4. In a stock feeding device for machines, means for causing alternate holding and releasing of stock before and after working thereof, means operable in timed relation with the operation of the holding means for advancing the stock thereto, including a reciprocable contractile member for gripping the stock inserted therein, an element engageable with the rear end of the stock for introduction into the reciprocable member when the length of the stock is such that the member is not operable to feed it further, and means cooperating with formations upon the periphery of the element for permitting the reciprocable member to advance the element and therewith the stock, but rendered effective for preventing the retraction of the element when the member is retracted.

5. In a stock feeding device for machines, means for causing alternate holding and releasing of stock before and after working thereof, means operable in timed relation with the operation of the holding means for advancing the stock thereto, including a reciprocable sleeve having a plurality of tensioned fingers for gripping the stock inserted therein, an element engageable with the rear end of the stock for introduction into the sleeve when the length of the stock is such that the sleeve is not operable to feed it further, and pivotal means cooperating with formations upon the peripheral surface of the element for permitting the sleeve to advance the element and therewith the stock, but rendered effective for preventing the retraction of the element when the sleeve is retracted.

6. In a stock feeding device for machines, means for causing alternate holding and releasing of stock before and after working thereof, means operable in timed relation with the operation of the holding means for advancing the stock thereto, including a reciprocable member for receiving the stock inserted therein an element, engageable with the rear end of the stock for introduction into the reciprocable member when the length of the stock is such that the member is not operable to feed it further, means cooperating with formations upon the peripheral surface of the element for permitting the reciprocable member to advance the latter means and therewith the stock, but rendered effective for preventing the retraction of the element when the member is retracted, and means for rendering the means cooperating with formations upon the peripheral surface of the element ineffective when the member is engaged with the stock.

7. In a stock feeding device for machines, means for causing alternate holding and releasing of stock before and after working thereof, means operable in timed relation with the operation of the holding means for advancing the stock thereto, including a reciprocable contractile member for gripping the stock inserted therein, a hollow element engageable with the rear end of the stock for introduction into the reciprocable member when the length of the stock is such that the member is not operable to feed it further, and means cooperating with ratchet grooves formed peripherally upon the element for permitting the reciprocable member to advance the element and therewith the stock, but rendered effective for preventing the retraction of the element when the member is retracted.

8. In a stock feeding device for machines, means for causing alternate holding and releasing of stock before and after working thereof, means operable in timed relation with the operation of the holding means for advancing the stock thereto, including a reciprocable contractile member for gripping the stock inserted therein, an element engageable with the rear end of the stock for introduction into the reciprocable member when the length of the stock is such that the member is not operable to feed it further, and a yieldable pawl engaging in ratchet grooves formed in the periphery of the element for permitting the reciprocable member to advance the element and therewith the stock, but rendered effective for preventing the retraction of the element when the member is retracted, and means for rendering the pawl ineffective when the member is engaged with the stock.

9. In a stock feeding device for machines, means for causing alternate holding and releasing of stock before and after working thereof, means operable in timed relation with the operation of the holding means for advancing the stock thereto, including a reciprocable member for receiving the stock inserted therein, an element engageable with the rear end of the stock for introduction into the reciprocable member when the length of the stock is such that the member is not operable to feed it further, a plurality of oppositely disposed pivotal pawls engaging in ratchet grooves formed in the periphery of the element for permitting the reciprocable member to advance the element and therewith the stock, but rendered effective for preventing the retraction of the element when the member is retracted, and a rotatable element surrounding the pawls and provided with cam surfaces engageable with the pawls for simultaneously rendering the pawls ineffective when the member is engaged with the stock.

10. In a multiple spindle article working apparatus, a plurality of spindles revolving about a common central axis, means including a reciprocable sleeve within each spindle cooperating therewith for causing alternate holding and releasing of stock positioned axially of the sleeve before and after working thereof, a reciprocable contractile member for gripping the stock arranged axially of the spindle operable in timed relation with the operation of the reciprocable stock holding sleeve for advancing the stock thereto, an element engageable with the rear end of the stock for introduction into the contractile member when the length of the stock is such that the member is not operable to feed it further, and means cooperating with the peripheral surface of the element for permitting the contractile member to advance the latter means and therewith the stock, but rendered effective for preventing the retraction of the element when the contractile member is retracted.

11. In a stock feeding device for machines, means for advancing stock to a working position, including a movable member adapted to engage the stock, an element engageable with the rear end of the stock and comprising a portion of similar shape to the stock to adapt it to be engaged and advanced by the movable member and also comprising a portion having a specially formed surface, and means cooperating with said surface for preventing the retraction of the element.

In witness whereof, I hereunto subscribe my name this 29th day of August, A. D. 1929.

JOHN S. STULL.